April 5, 1966  R. J. MELTZER  3,244,468
DIORAMA HAVING VISUAL ACUITY TARGETS
Filed May 5, 1961

INVENTOR.
ROBERT J. MELTZER
BY
ATTORNEYS

United States Patent Office 3,244,468
Patented Apr. 5, 1966

3,244,468
DIORAMA HAVING VISUAL ACUITY TARGETS
Robert J. Meltzer, Irondequoit, N.Y., assignor to Bausch & Lomb Incorporated, Rochester, N.Y., a corporation of New York
Filed May 5, 1961, Ser. No. 108,114
1 Claim. (Cl. 351—17)

This invention relates to a novel diorama and more particularly to a novel diorama for testing visual acuity.

Dioramas are devices which include scenic representations and means defining an aperture through which the representation is viewed. The devices may include diminutive two or three dimensional figures arranged in spaced relation to provide a three dimensional scene. The arrangements generally include means for illuminating the representations for viewing purposes.

Devices for testing visual acuity include stereoscopic views on which targets are formed photographically. The targets are graduated as to size and are placed at a distance from the observer. This arrangement provides conditions which correspond to equal size targets accurately spaced at a relatively large distance from an observer.

A diorama according to the present invention includes a three dimensional scenic representation. The three dimensional representation simulates a scene which has the effect of a perspective view. According to the novel arrangement the scene appears to extend to infinity. Graduated figures or acuity targets may be placed in the scenic representation and arranged for testing the acuity of the viewer.

Advantageously, a device according to the present invention is relatively inexpensive to manufacture and is useful as an actual testing device or as a relatively inexpensive display.

Briefly, the invention contemplates a novel diorama which comprises a three dimensional scenic representation and means for illuminating the scenic representation. The illumination means according to one embodiment of the invention is a diffusion plate, however any means for providing illumination for the scenic representation may be used without departing from the scope of the invention. An image forming element such as an objective lens is arranged between the scenic representation and the eye of a receiver. Preferably the objective lens is mounted in a front wall of the device. The objective lens is arranged so that it's focal point coincides with a rear portion of the scenic representation i.e., the focal length of the lens is equal to the distance between the lens and the rear portion of the representation. The novel arrangement gives the effect of a perspective view which appears to extend to infinity. Acuity targets may be placed at various points between the lens and the rear portion of the scenic representation to test the visual acuity of a viewer.

According to another embodiment of the invention the image forming element is a mirror which is arranged so that a reflected image of the scenic representation may be viewed through an aperture. The portion of the scenic representation which is at the focal length of the mirror will appear to be at infinity.

The invention will now be described in more detail in connection with the accompanying drawings in which.

Figure 1:
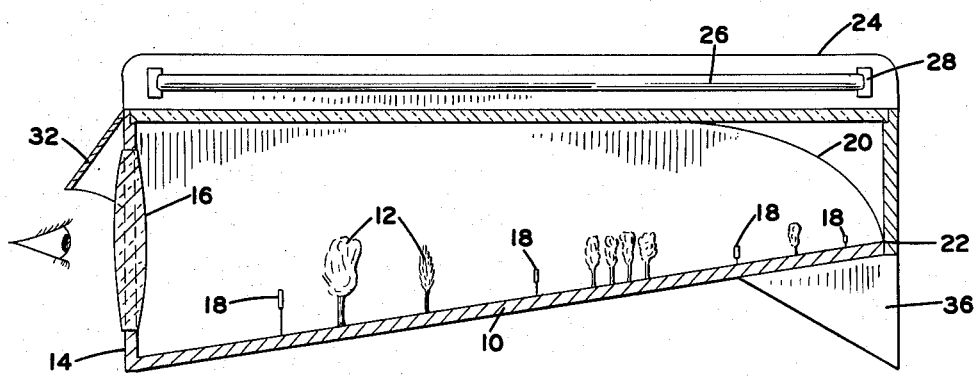
FIG. 1 is a side elevational view of a diorama according to one embodiment of the present invention.

The diorama, as shown in the drawings comprises a base 10 which has a three dimensional scenic representation arranged thereon. The representation may be painted on the base 10. The representation takes the form of a road scene in FIGS. 1–3. Generally the base 10 has a plurality of two or three dimensional figures 12 mounted thereon. The figures 12 are generally stepped in size and arranged at different distances from a viewer. In some cases the figures 12 constitute acuity targets which are arranged for testing the visual acuity of an observer.

A front wall 14 has an objective lens 16 mounted therein and is arranged so that the scenic representation may be viewed through the objective lens 16. Generally the front wall 14 and the base 10 resemble the respective portions of a generally rectangular box, wherein the front wall 14 so that the included angle between the wall 14 and erally the base 10 will be tilted with respect to the front wall 14 so that the included angle between the wall 14 and base 10 is less than 90 degrees. The base 10 slopes upwardly toward a top rear portion 20 of the diorama. Acuity targets 18 may be placed at preselected distances from the objective lens 16 for testing the visual acuity of the viewer.

The top rear portion 20 is arranged to simulate the sky and tapers downwardly to meet the rear portion of the base 10. The top portion 20 generally comprises a curved surface and, as illustrated, curves downwardly toward the base 10. The line where the top portion 20 intersects the rear portion of the base 10 forms a rear portion 22 of the diorama. This line of intersection simulates the horizon and since it is at the focal point of the object lens 16, it will appear to be at infinity.

Figure 2:
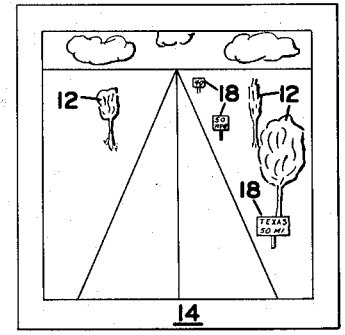
FIG. 2 is a front view of the diorama illustrating a scenic representation as seen through an objective lens.
Figure 3:
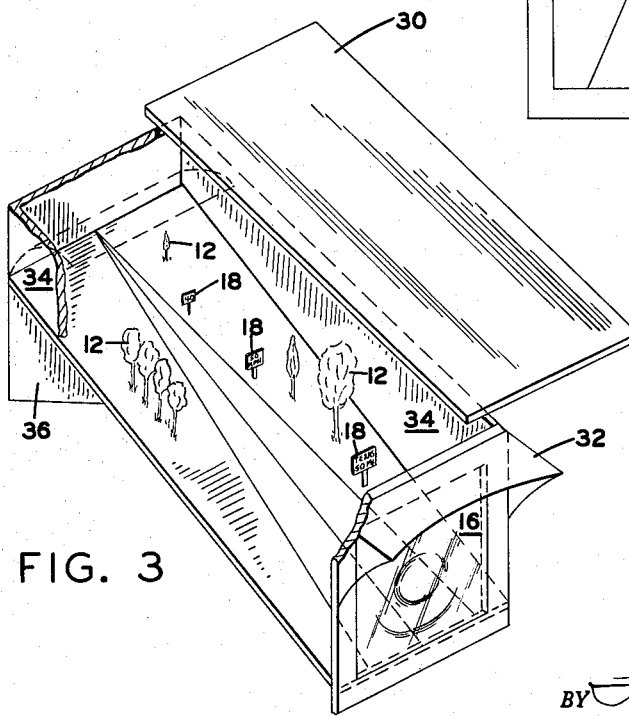
FIG. 3 is a perspective view of the diorama according to a second embodiment of the invention.

The illumination means 24 shown in FIG. 1 forms the top of the generally box-like structure. The illumination means 24 includes a fluorescent light 26 mounted in the sockets 28. The illumination means 24 may be replaced by a diffusion plate 30 as shown in FIG. 3. The diorama also includes a hood 32 which is fixed to the front wall 14, and a pair of side walls 34. The hood 32 is provided for reducing the glare caused by exterior light striking the objective lens 16. The side walls 34 complete the box-like structure.

A support 36 may be fixed to the rear portion 22 of the diorama so that the diorama may be arranged or mounted on a generally horizontal surface.

Figure 4:
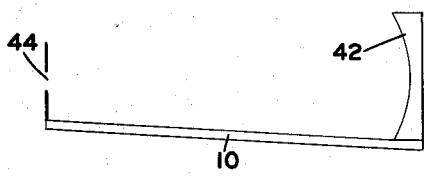
FIG. 4 is a schematic illustration of a third embodiment of the invention.

A third embodiment of the invention as shown in FIG. 4 comprises a base 10, a mirror 42 and an aperture stop 44. A scenic representation is arranged on the base 10 so that a reflected image of the scenic representation may be viewed through the aperture 44. The mirror 42 is arranged so that it's focal point coincides with a portion of the scenic representation whereby that portion of the representation will appear to be at infinity.

A diorama compriing the combination of a three di-
What is claimed is:
mentional scenic representation and means for illuminating said representation, a positive lens, and means mounting said positive lens in front of and adjacent to said representation whereby said representation may be viewed through said positive lens, said positive lens having a focal length equal to the distance between said lens and the rear portion of said representation whereby the rear portion of said representation will appear to be at infinity, and a series of acuity determining targets varying in size and arranged in stepped relation, each of said targets having a size of pre-established acuity value, said targets located on said representation between said positive lens and said rear portion of said scenic representation whereby said targets may be viewed through said positive lens.

References Cited by the Examiner

UNITED STATES PATENTS

| | | | |
|---|---|---|---|
| 71,089 | 11/1867 | Walter | 88—1 |
| 248,219 | 10/1881 | Schissel | 88—1 |
| 1,097,609 | 5/1914 | Brown. | |
| 1,899,139 | 2/1933 | Dieterich. | |
| 2,196,904 | 4/1940 | Sherman | 88—20 |
| 2,232,110 | 2/1941 | Gruenhut | 40—130 X |

FOREIGN PATENTS

| | | |
|---|---|---|
| 1,098,179 | 3/1955 | France. |
| 465,795 | 9/1928 | Germany. |

JEWELL H. PEDERSEN, *Primary Examiner.*

WILLIAM MISIEK, *Examiner.*